United States Patent [19]

Schmidt

[11] 4,368,949
[45] Jan. 18, 1983

[54] COUPLING DEVICE FOR TERMINALS HAVING LIGHT-CONDUCTIVE FILAMENTS

[75] Inventor: Bernhard Schmidt, Neunkirchen, Fed. Rep. of Germany

[73] Assignee: Felten & Guilleaume Carlswerk AG, Cologne, Fed. Rep. of Germany

[21] Appl. No.: 198,239

[22] Filed: Oct. 17, 1980

[30] Foreign Application Priority Data

Dec. 18, 1979 [DE] Fed. Rep. of Germany ....... 2950853

[51] Int. Cl.³ .............................................. G02B 7/26
[52] U.S. Cl. .............................. 350/96.21; 350/96.20
[58] Field of Search ................. 350/96.20, 96.21, 96.22

[56] References Cited

U.S. PATENT DOCUMENTS

| 3,734,594 | 5/1973 | Trambarulo | 350/96.21 |
| 4,080,044 | 3/1978 | Gousseau | 350/96.21 |
| 4,205,898 | 6/1980 | Matthews et al. | 350/96.21 |
| 4,236,787 | 12/1980 | Iacono et al. | 350/96.21 |

FOREIGN PATENT DOCUMENTS

| 53-28440 | 3/1978 | Japan | 350/96.21 |
| 2010521 | 6/1979 | United Kingdom | 350/96.21 |
| 1558914 | 1/1980 | United Kingdom | 350/96.21 |

*Primary Examiner*—John D. Lee
*Attorney, Agent, or Firm*—Michael J. Striker

[57] ABSTRACT

The invention relates to a coupling device for connecting the terminals of a pair of light-conductive filaments. The coupling device includes a housing, a clamping elongated member positioned within a recess formed in the housing and having a bore to receive two opposite ends of the terminals to be coupled. The clamping member is formed with two parallel longitudinal extensions. The housing is provided with two grooves each positioned in the region of the recess of the housing and extending transversely to the longitudinal central plane of the recess. Each of the grooves accommodates a plurality of pressure-transmitting elements. The housing is closed at each end thereof with a cup-shaped enclosure threadably mounted on the housing. Upon threading the enclosure onto the housing after the terminal to be connected with the other terminal has been inserted therein the enclosure exerts axial pressure which is transmitted to the pressure-transmitting elements located in each groove which in turn transmit this pressure to the extensions of the clamping member so that the latter clamps the terminals to be connected.

23 Claims, 11 Drawing Figures

FIG. 9
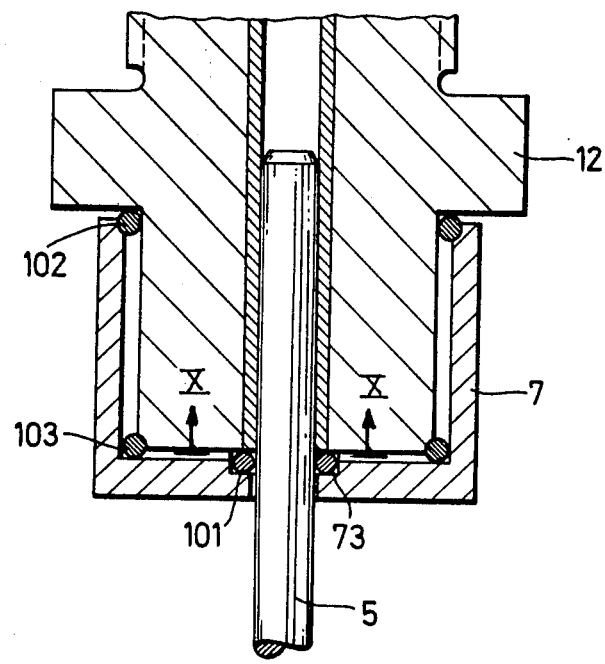
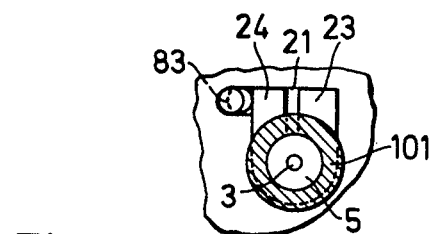
FIG. 10

COUPLING DEVICE FOR TERMINALS HAVING LIGHT-CONDUCTIVE FILAMENTS

BACKGROUND OF THE INVENTION

The present invention relates to coupling arrangements for fastening together a pair of terminals having light-conductive filaments.

The coupling devices for coupling terminals of a pair of light-conductive filaments have been proposed in the prior art. These coupling devices generally include a tubular clamping member having an individual clamping element for each of the terminals being connected. A longitudinal slot and a transversal slot have been provided in the clamping member of the known device to obtain the clamping action on the ends of the terminals in a radial direction, which provides the clamping of the terminals to be connected independently one from another. However, it has been found desirable to provide for individual clamping of both opposite terminals by affecting the ends of the terminals to be attached from outside. This, however was not achieved in the prior art arrangements.

SUMMARY OF THE INVENTION

It is therefore, one object of the invention to provide a coupling device for coupling terminals of a pair of light-conductive filaments which avoids by simple means the short-comings encountered in the prior art.

Another object of the invention is to provide a coupling device where the axial pressure exerted on the terminal ends to be connected is transmitted through pressure-transmitting means to clamping means which individually clamp each of the terminal ends by applying an outside turning force onto the housing of the device.

These and other objects of the invention are attained by a coupling device for coupling the terminals of a pair of light-conductive filaments, comprising a housing having an open-ended recess, clamping means inserted in said recess which clamping means includes an elongated body having a bore to receive opposite ends of a pair of terminals of light-conductive filaments to be connected, the elongated body being formed with two generally parallel longitudinal extensions defining an elongated slot therebetween, the housing having in the region of each end portion of the recess at least one groove including one portion extending outwardly from said recess in a direction transverse to the longitudinal center plane of said recess, and another portion extending generally parallel to said recess and cap means mounted on the housing at each end of said recess. Pressure-transmitting means is located in said groove in contact with the elongated body and adapted to be engaged by the respective cap means whereby, upon turning movement of the cap means in a sense threading the same onto the housing, the cap means exert axial pressure upon the pressure-transmitting means which transmits said pressure to the extensions of the elongated body so that the extensions clamp the terminals to be connected.

The advantage of this invention resides in that the clamping action on the terminal ends is achieved upon pressure applied from outside of the arrangement and the substantially axial movement of the threaded cap means relative to the clamping member such as an elongated body is transmitted in a right-angled direction so that pressure is developed on two parallel extensions of the clamping member which transmits this pressure into radial pressure uniformly distributed on the outer surfaces of the terminals being connected.

The housing of the coupling device may be provided with a flange radially outwardly extending from an outer surface of the housing, this flange may be formed with a portion at least on one inner side thereof, this portion extending inwardly radially towards the recess in the housing and adapted to divide the groove formed in the housing into two successively positioned grooves each longitudinally extending toward the respective cap means.

The pressure-transmitting means may include a plurality of pressure-transmitting elements positioned in each of the longitudinally extended grooves in contact with one another.

The pressure-transmitting elements may be balls.

The coupling device may also include a pair of pressure members each positioned in the respective one of the longitudinal grooves between the balls and the respective cap means.

The coupling device of the invention may further include a pair of washers each located between the respective one of said pressure members and the respective cap means.

The diameter of each of said balls may be substantially smaller than the width of the portion of the groove.

Each of the pressure-transmitting elements may have a trapezoidal cross-section, said elements being so positioned within each of the longitudinally extended grooves as to provide a form-locking connection between each two successively situated elements.

Each of the pressure-transmitting elements may have a triangular cross-section, said elements being so positioned within each of said longitudinally extended grooves as to provide a form-locking connection between each two successively situated elements. The slot of the elongated body may be located in a plane passing through the axis of said bore.

This slot may be located in a plane which is laterally off-set relative to the axis of said bore.

The elongated body may be rigidly connected to said housing.

This elongated body may be glued to said housing.

The elongated body may be threaded to the housing of the coupling device.

The cap means may include a pair of cup-shaped members, each of said cup-shaped members having an open end and an internal thread to be fastened to the housing.

The device may further comprise a pair of first sealing rings each positioned between said open end of the respective cup-shaped member and the corresponding surface of said flange.

Each of said cup-shaped members may include an over-hanging cylindrical portion axially extending from said open end of the cup-shaped member.

This overhanging portion may be provided with a number of openings, and the respective number of pins being inserted into said openings for limiting the undesirable turning movement and loosening of said cap means relative to the housing.

Each of the cap-shaped members may have a thread-relief region and a second sealing ring may be placed into this thread-relief region.

A circular recess may be formed at the inner side of each of the cup-shaped members, a third sealing ring being inserted into this circular recess.

The objects of the invention may be also attained by a coupling device for coupling a terminal of a light-conductive filament with an optical element, which device comprises a housing having an open-ended recess, a chamber to accomodate the optical element, the chamber being in communication with said recess and clamping means inserted into said recess, the clamping means including an elongated body having a bore to receive an end of the terminal of the light-conductive filament to be connected with the optical element, the elongated body being formed with two generally parallel longitudinal extensions defining an elongated slot therebetween, the housing having in the region of said recess at least one groove including one portion extending outwardly from said recess in a direction transverse to the longitudinal center plane of the recess, and another portion extending generally parallel to the recess and cap means mounted on the housing at the end of insertion of said terminal therein. Pressure-transmitting means is located in said groove in contact with the elongated body and adapted to be engaged by the cap means whereby, upon turning movement of the cap means in a sense threading the same onto the housing, the cap means exerts axial pressure upon the pressure-transmitting means which transmits said pressure to said extensions so that the same clamp the terminal when the latter is connected to said optical element.

An optical element to be connected with a terminal end by the coupling device of the invention may be alternately an emitter or a receiver diode.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWINGS

FIG. 9 is a sectional elevational view of a coupling device, partially broken away, illustrating sealing means provided in the coupling device according to the invention;

FIG. 10 is a partial sectional view taken along line X—X of FIG. 9; and

DETAILED DESCRIPTION OF THE INVENTION

Figure 1:
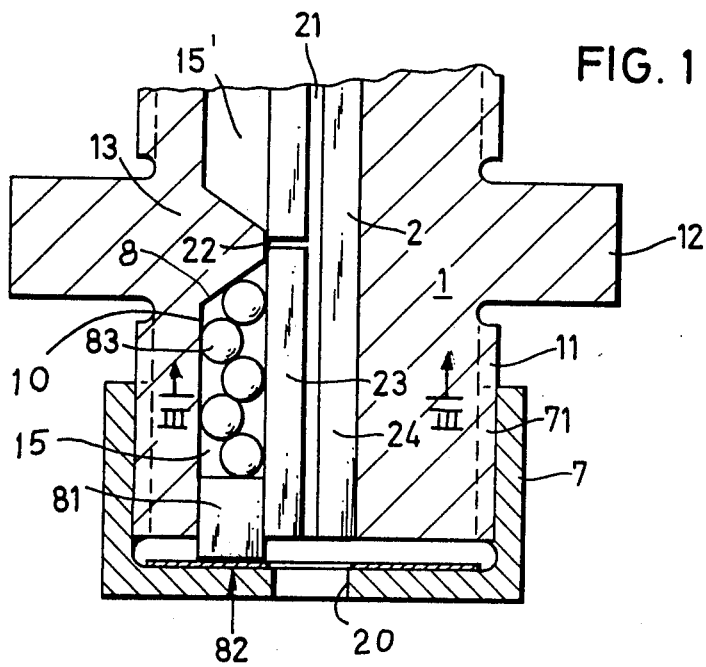
FIG. 1 is a sectional elevational view of a coupling device partially broken away, in accordance with the invention.
Figure 2:
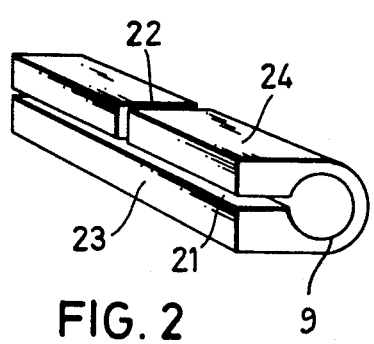
FIG. 2 is a perspective view of a clamping element which is mounted in the coupling device shown in FIG. 1.

Referring to the drawings, FIG. 1 illustrates the first embodiment of the coupling device of the invention where the reference numeral 1 designates a housing which is formed with an axial central recess 14 to receive a clamping member 2. The clamping member 2 separately shown in FIG. 2 is provided with a bore 9 in which two opposite terminals 5 with light-conductive filaments 3 are to be inserted for coupling together. The housing 1 is formed with a flange 12 which is outwardly radially projected from the outer surface of the housing. The flange 12 has at one side thereof an inwardly extending portion 13 which serves as a partition dividing a groove formed in the housing into two elongated grooves 15 and 15'. The clamping member 2 has a tube-shaped elongated body formed with two substantially parallel extensions 23 and 24 which are spaced one from another to define a slot 21 therebetween. Slot 21 is in communication with the bore 9. A transversal slot 22 is provided in the clamping element 2 which is located in the assembly substantially against the partition 13.

A pressure-transmitting arrangement is provided in the coupling device of the foregoing type which includes a cup-shaped cap 7 having an internal thread 71 to be fastened to the housing 1 having at each opposite end thereof the respective external thread. A plurality of pressure-transmitting balls 83 are positioned in each of the grooves 15 and 15'. Only one groove 15 is fully shown in FIGS. 1 and 2. As may be seen in FIGS. 1 and 2, the groove 15 has a first portion 8 which extends outwardly from the recess 14 in a direction transverse to the longitudinal central plane of the recess, and another portion 10 extending generally parallel to the recess 14. A pressure-transmitting member 81 is placed in the assembly between the balls 83 and a substantially flat ring 82 located on the inner surface of the cup-shaped member 7.

A bore 20 is provided in the lower wall of the cap 7 to admit the end of a terminal passing thereafter through the bore 9 of the clamping member 2.

When the cap 7 is mounted on the end of the housing 1 the turning movement of the cap upon threading the same onto the housing causes axial pressure on the balls 83 through the ring 82 and pressure-transmitting member 81. This axial pressure is then transmitted to the extensions 23, 24 of clamping member 2 in a transverse direction so that they clamp the terminals to be connected. The provision of the device with a clamping member having a transverse slot 22 dividing one of the extensions into two substantially equal parts and with a transversal groove 15 at each end of the housing for accommodating pressure-transmitting elements provides a reliable clamping of two opposite terminals individually by affecting the clamping action from outside of the housing.

Figure 3:
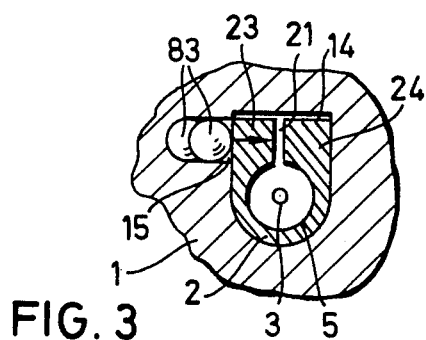
FIG. 3 is a partial sectional view taken along line III—III of FIG. 1.

FIG. 3 shows the clamping member 2 in which the longitudinal slot 21 is passing through a plane which passes through the axis of the bore 9 receiving the terminals 5. It should be noted that the diameter of the balls 83 is substantially smaller than the width of the groove 15 and the balls 83 are tightly disposed in the groove 15 in contact with the extension 23 of the clamping member 2.

Figure 4:
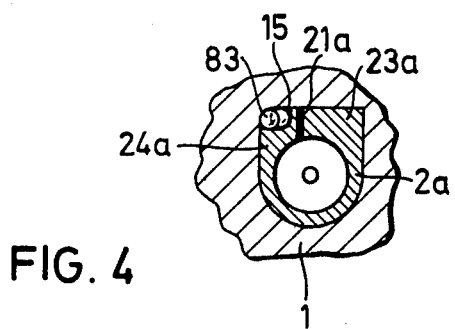
FIG. 4 is a partial sectional view illustrating a clamping element having a slot laterally offset relatively to the central bore of the clamping element.

In the embodiment illustrated in FIG. 4, the longitudinal slot designated as 21a, which is analogous to the slot 21 of the clamping member, is located in this structure in a plane which is laterally offset with respect to the axis of the bore 9 so that the slot 21a divides a clamping member 2a into a smaller portion 24a and a larger portion 23a. The smaller portion 24a is formed with the groove 15 to accommodate the balls 83. This construction may be advantageously utilized for the terminals of relatively large diameters, whereas the structure shown in FIG. 3 may be preferred for the terminals of relatively small diameters.

Figure 5:
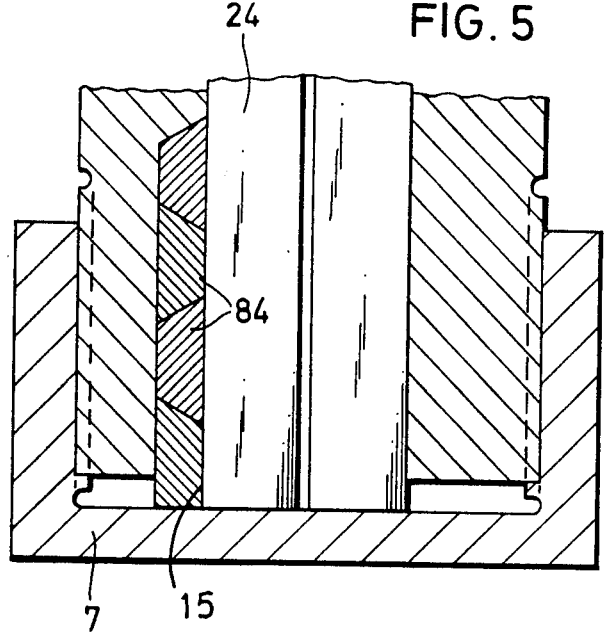
FIG. 5 is a sectional elevational view of another embodiment of the coupling device, with a portion removed.

FIG. 5 illustrates still another embodiment of the coupling device where the pressure-transmitting balls 83 are replaced by the pressure-transmitting elements 84 each having a trapezoidal cross-section. The elements 84 are tightly positioned within the groove 15 in such a manner that two successively situated elements provide a form-locking connection between one another. In this embodiment the pressure-transmitting member 81 and ring 82 are not required.

Figure 6:
FIG. 6 is a partial sectional view of the pressure-transmitting elements to be mounted in the coupling device, according to a further embodiment of the invention.

FIG. 6 shows a plurality of pressure-transmitting elements 85 each having a triangular cross-section. These elements may be placed in the form-locking connection into the groove 15 to transmit the axial pressure exerted during threading of the cap 7 onto the housing 1 to the clamping member 2.

Figure 7:
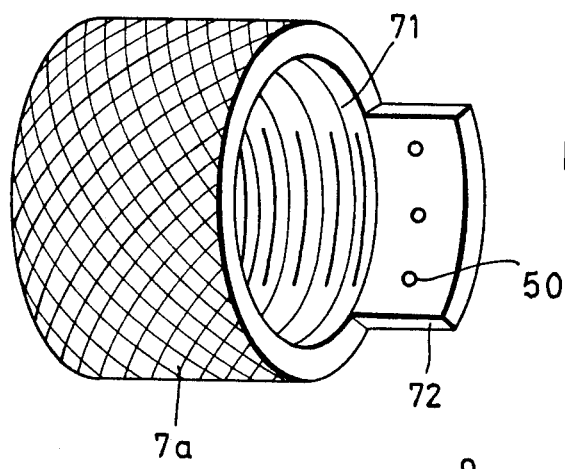
FIG. 7 is a perspective view of a cup-shaped element enclosing the housing of the coupling device in accordance with still another embodiment of the invention.
Figure 8:
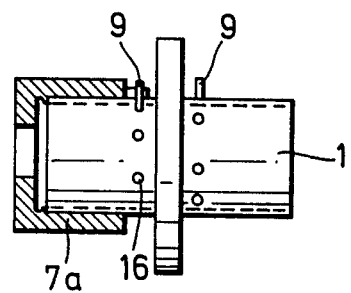
FIG. 8 is an axial view, partially in section, showing means for limiting undesirable turning movement of the cup-shaped member on the housing of the coupling device.

FIGS. 7 and 8 show still a further embodiment of the coupling device where the cap denoted as 7a in this structure is formed with an axially extending overhanging portion 72 which has a form of a segment with angle 90°. This portion is provided with a number of openings 50. The respective openings 16 are made in the housing 1. In assembling, pins 9 are inserted into openings 50 and openings 16, respectively, to prevent further turning and loosening of the cap 7 on the housing 1.

FIGS. 9 and 10 illustrate still another embodiment of the invention where sealing means are provided in the coupling device of the foregoing type. In this embodiment, a circular groove 73 is formed on the inner side of the cap 7 to receive a first sealing ring 101 which seals the end of the terminal 5 inserted into the coupling device. A second sealing ring 102 is located between an open end of the cup-shaped cap 7 and the corresponding surface of the flange 12. The third sealing ring 103 is placed in the area of the thread-relief region whereby all the structure is reliably sealed. It is understood that the analogous sealing means (not shown) are provided at the other end of the housing wherein the second terminal 5 is inserted to be clamped in the coupling device.

Figure 11:
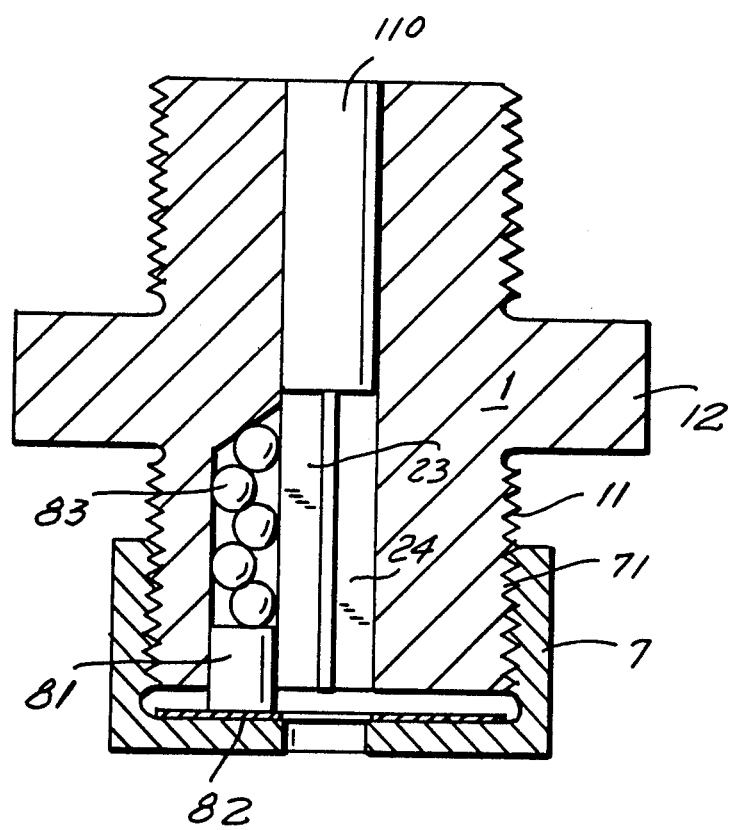
FIG. 11 is a sectional elevational view of a coupling device utilized for coupling a terminal of a light-conductive filament with an optical element.

FIG. 11 shows a coupling device which may be utilized for connecting a terminal of the light-conductive filament with an optical element such as an emitter, receiver diode or the like. As may be seen in FIG. 11, the lower part of the coupling device is analogous to that illustrated in FIG. 1 and described hereinabove. In place of the second terminal to be inserted into the coupling device a suitable optical element of any conventional type denoted by numeral 110 may be placed into the housing 1 to be coupled with the terminal of the light-conductive filament. In this case the clamping element 2 is formed with the longitudinal slot 21 defined by two extensions 23 and 24 operating in the manner described above.

It will be understood that each of the elements described above, or two or more together, may also find a useful application in other types of coupling devices differing from the types described above.

While the invention has been illustrated and described as embodied in a coupling device it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A coupling device for coupling the terminals of a pair of light-conductive filaments, comprising a housing having an open-ended recess; clamping means inserted in said recess, said clamping means including an elongated body having a bore to receive opposite ends of a pair of terminals of light-conductive filaments to be connected, said elongated body being formed with two generally parallel longitudinal extensions defining an elongated slot therebetween, said housing having in the region of each end portion of said recess at least one groove including one portion extending outwardly from said recess in a direction transverse to the longitudinal central plane of said recess, and another portion extending generally parallel to said recess; cap means mounted on said housing at each end of said recess; and pressure-transmitting means located in said groove in contact with said elongated body and adapted to be engaged by the respective cap means whereby, upon turning movement of said cap means in a sense threading the same onto said housing, said cap means exert axial pressure upon said pressure-transmitting means which transmits said pressure to said extensions so that the same clamp the terminals to be connected.

2. The device of claim 1, wherein said housing includes a flange radially outwardly extending from the outer surface of said housing, said flange having a portion at at least one inner side thereof, said portion extending inwardly radially towards said recess and adapted to divide said groove into two successively positioned grooves each longitudinally extending toward the respective cap means.

3. The device of claim 2, wherein said pressure-transmitting means include a plurality of pressure-transmitting elements positioned in each of said longitudinally extended grooves in contact with one another.

4. The device of claim 3, wherein said elements are balls.

5. The device of claim 4, further including a pair of pressure members each positioned in the respective one of said longitudinally extended grooves between said balls and the respective cap means.

6. The device of claim 5, further including a pair of washers each located between the respective one of said pressure members and the respective cap means.

7. The device of claim 6, wherein the diameter of each of said balls is substantially smaller than the width of said another portion of said groove.

8. The device of claim 3, wherein each of said elements has a trapezoidal cross-section, said elements being so positioned within each of said longitudinally extended grooves as to provide a form-locking connection between each two successively situated elements.

9. The device of claim 3, wherein each of said elements has a triangular cross-section, said elements being so positioned within each of said longitudinally extended grooves as to provide a form-locking connection between each two successively situated elements.

10. The device of claim 3, wherein said slot is located in a plane passing through the axis of said bore.

11. The device of claim 3, wherein said slot is located in a plane which is laterally offset relative to the axis of said bore.

12. The device of claim 3, wherein said elongated body is rigidly connected to said housing.

13. The device of claim 12, wherein said elongated body is glued to said housing.

14. The device of claim 12, wherein said elongated body is threaded to said housing.

15. The device of claim 3, wherein said cap means include a pair of cup-shaped members, each of said cup-shaped members having an open end and an internal thread to be fastened to said housing.

16. The device of claim 15, further comprising a pair of first sealing rings each positioned between said open end of the respective cup-shaped member and the corresponding surface of said flange.

17. The device of claim 16, wherein each of said cup-shaped members includes an overhanging cylindrical portion axially extending from said open end of the cup-shaped member.

18. The device of claim 17, wherein said overhanging portion is provided with a number of openings, and a respective number of pins being inserted into said openings and passing into said housing for limiting the undesirable turning movement and loosening of said cap means on said housing.

19. The device of claim 16, wherein each of said cup-shaped members has a thread-relief region and a second sealing ring being placed into said thread-relief region.

20. The device of claim 19, wherein a circular recess is formed at the inner side of each of said cup-shaped members, and a third sealing ring being inserted into said circular recess.

21. A coupling device for coupling a terminal of a light-conductive filament with an optical element, comprising a housing having an open-ended recess and a chamber to accommodate said optical element, said chamber being in communication with said recess; clamping means inserted in said recess, said clamping means including an elongated body having a bore to receive an end of the terminal of a light-conductive filament to be connected with said optical element, said elongated body being formed with two generally parallel longitudinal extensions defining an elongated slot therebetween; said housing having in the region of said recess at least one groove including one portion extending outwardly from said recess in a direction transverse to the longitudinal central plane of said groove, and another portion extending generally parallel to said recess; cap means mounted on said housing at the end of insertion of said terminal therein; and pressure-transmitting means located in said groove in contact with said elongated body and adapted to be engaged by said cap means whereby, upon turning movement of said cap means in a sense threading the same onto said housing, said cap means exerts axial pressure upon said pressure-transmitting means which transmits said pressure to said extensions so that the same clamp the terminal when the latter is connected to said optical element.

22. The coupling device of claim 21, wherein said optical element is an emitter.

23. The coupling device of claim 21, wherein said optical element is a receiver diode.

* * * * *